(12) United States Patent
Chang

(10) Patent No.: US 6,791,231 B2
(45) Date of Patent: Sep. 14, 2004

(54) TWO-POLE MOTOR'S STATOR FOR A HOUSEHOLD FAN

(76) Inventor: Fang-Fu Chang, 3F, No. 275, Neihu Rd., Sec. 1, Neihu, Taipei (TW)

( * ) Notice: Subject to any disclaimer, the term of this patent is extended or adjusted under 35 U.S.C. 154(b) by 0 days.

(21) Appl. No.: 10/419,801

(22) Filed: Apr. 22, 2003

(65) Prior Publication Data

US 2004/0130232 A1 Jul. 8, 2004

(30) Foreign Application Priority Data

Jan. 3, 2003 (CN) .................................. 03227960 U

(51) Int. Cl.[7] .............................. H02K 1/16; H02K 1/06
(52) U.S. Cl. ....................................................... 310/216
(58) Field of Search ................................ 310/216, 217, 310/218, 254

(56) References Cited

U.S. PATENT DOCUMENTS

2001/0030483 A1 * 10/2001 Masumoto et al. ......... 310/216
2002/0130581 A1 * 9/2002 Arai et al. .................. 310/215

* cited by examiner

Primary Examiner—Tran Nguyen
(74) Attorney, Agent, or Firm—Troxell Law Office PLLC

(57) ABSTRACT

The invention relates to a two-pole motor's stator for a household fan having slots with tapered close end and greater width by enlarging the stator's middle hole (for accommodating a rotor with greater diameter) under the precondition without influence on the stator's yoke height and the capacity (or area) of each slot. Therefore, the output torsion of the rotor is enhanced and the stator's yoke height is increased while the iron loss and the temperature rise are reducible for upgrading the rotation efficiency. Meanwhile, the high slot-occupied ratio to affect the assembling efficiency is also avoidable.

2 Claims, 4 Drawing Sheets

TWO-POLE MOTOR'S STATOR FOR A HOUSEHOLD FAN

BACKGROUND OF THE INVENTION

1. Field of the Invention

The invention relates to a two-pole motor's stator for a household fan, and more particularly, to an improved motor's stator design with less stator's iron loss, reduced temperature rise, more torsion output and greater rotation efficiency.

2. Description of the Related Art

Conventional household fans (e.g. electric fans, extractor fans, exhaust blowers, etc.) employ a squirrel-cage rotor's motor as power source. Depending upon the revolutions and torsion, the squirrel-cage rotor's motor has two-pole or four-pole configuration. Generally speaking, the output torsion of common motors is proportional to the square of the outer diameter of their rotors. Under this precondition that the stator's area remains unchanged, the increase of the rotor's diameter must lead to an increase of the diameter of the rotor-receiving middle hole of the stator, thereby reducing the height of stator's yoke (range of effective diameter from the outermost point of each slot to the stator's rim). Accordingly, the yoke magnetic density is so increased that it can't match with tooth magnetic density of the stator. In addition, the stator's iron loss and the temperature rise are also increased and the operational efficiency is lowered. In order to gain a balance point among the iron loss, efficiency and output torsion, it's inevitable to give up partial output torsion for achieving the increase of the efficiency. Accordingly, how to effectively upgrade the rotor's output under the restriction of fixed stator's area becomes a problem that experts in this field tries to overcome.

As shown in FIG. 1, a conventional two-pole stator 40 is formed by stacking up a plurality of silicon steel sheets 4. Meanwhile, the silicon steel sheets 4 include a middle hole 31 for receiving a rotor 6. A plurality of slots 42, around which a coil 5 is wound, is provided along the circumference of the middle hole 31. After the stator 40 and the rotor 6 are assembled (see FIG. 2), the slot 42 is through a slot neck 421 in connection with the middle hole 41, and the slot neck 421 is formed with two side rims 422 extending radially outwardly. A rounded corner 423 is formed between each side rim 422 and a straight end rim 424. The rotor 6 is received within the middle hole 41 of the silicon steel sheets 4 and kept at a certain clearance to the rim of the middle hole 41. After the current flows through the coil 5, a magnetic field is created to bring the rotor 6 into rotation. At the same time, the fan's blades are revolved.

The above-mentioned is a commonly used rotor's configuration of two-pole motor for household fans. In order to facilitate the assembly, the slot 42 has to reach a certain slot-occupying ratio which means the extent of the slot 42 wound by the coil 5. The greater the ratio is, the more crowded the slot 42 is, thereby leading to an inconvenient assembly. On the contrary, the smaller the ratio is, the looser the slot 42 is, thereby facilitating the assembly. In order to increase the slot's 42 area and, therefore, to reduce the slot-occupying rate, the height of the side rims 422 has to be increased under the precondition of fixed tooth width of silicon steel sheets 1 (that is, the fixed clearance between every two slots 42). However, this results in the decrease of height of stator's yoke (that is, range of effective diameter from the outermost point of each slot to the stator's rim), thereby increasing the stator's iron loss and, therefore, affecting the rotational efficiency. Accordingly, the most commonly used ratio of the diameter of the middle hole 41 of the stator and the effective outer diameter (described as "a" in FIG. 2) is 0.52–0.55 to 1. To take an example that the effective outer diameter of the silicon steel sheets 4 is 60 mm and the diameter of the middle hole is 31.5 mm, they are in a ratio of about 1:0.525. Meanwhile, the effective outer diameter of the slots 42 is described as "b" in FIG. 2 at about 50 mm while the yoke height is:

$$(a-b)/2.$$

Substitute the known values $$(60-50)/2$$

And the yoke height is 5 mm. This is a result of compromise between the rotational efficiency (lower iron loss and temperature rise) and the rotation feature (higher torsion output).

SUMMARY OF THE INVENTION

It is a primary object of the invention to remove the above-mentioned drawbacks and to provide a two-pole motor's stator for a household fan in which the stator's middle hole of stator's silicon steel sheets is so enlarged that each slot at the circumference of the middle hole has a greater width. Meanwhile, the slot's height is reduced. Thus, under the precondition without reducing the slot's area (which influences the assembling efficiency), the enlargement of the middle hole for accommodating a rotor with a greater diameter is capable of increasing the torsion output of the motor. Moreover, the increase of the yoke height is capable of reducing iron loss and temperature rise and enhancing the rotation efficiency.

It's another object of the invention to provide a two-pole motor's stator for a household fan having a tapered form which is so created at the close end of the slots that the slots are through corresponding slot necks in connection with the middle hole, and two sides of the slot neck are bent outwardly at an obtuse angle and then in connection with two side rims extending radially outwardly from the middle hole whereupon a rounded corner is formed between each side rim and a first end rim, and that an obtuse angle is formed by the first end rim and a second end rim of the slots. Accordingly, the height required by both side rims of the slots is effectively reduced for increasing the stator's yoke height.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
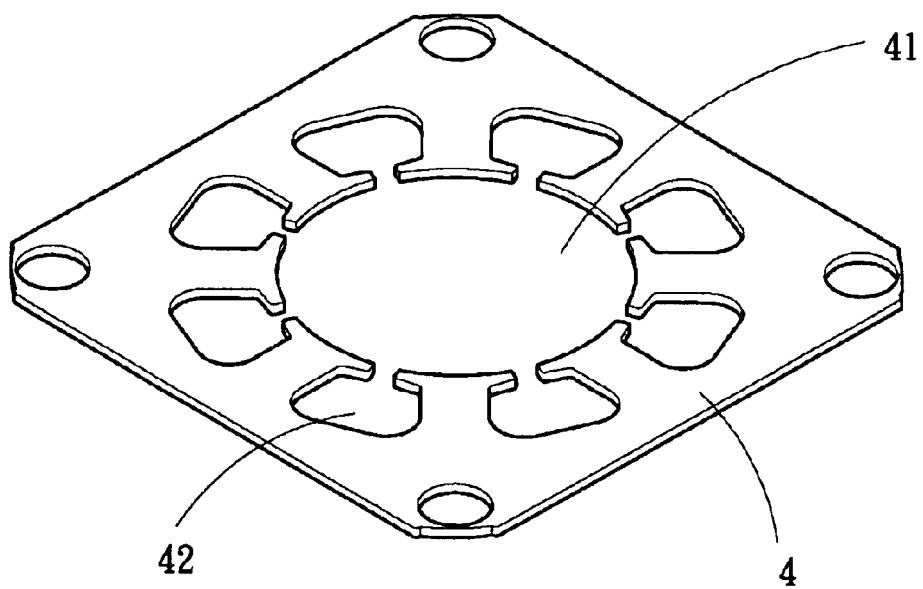
FIG. 1 is a perspective exploded view of a conventional two-pole motor's stator.
Figure 1:
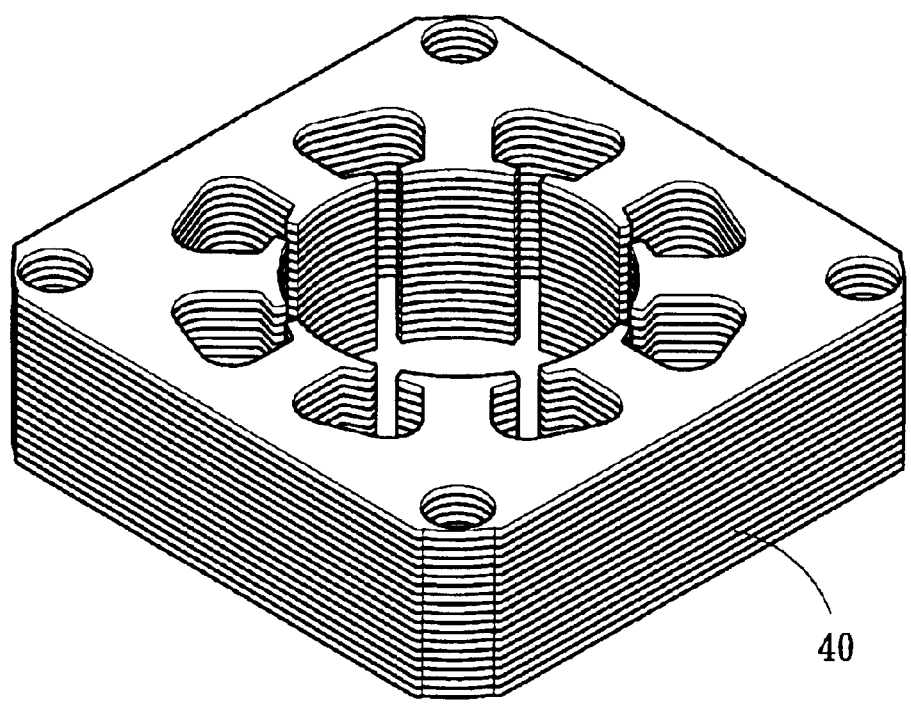
Figure 2:
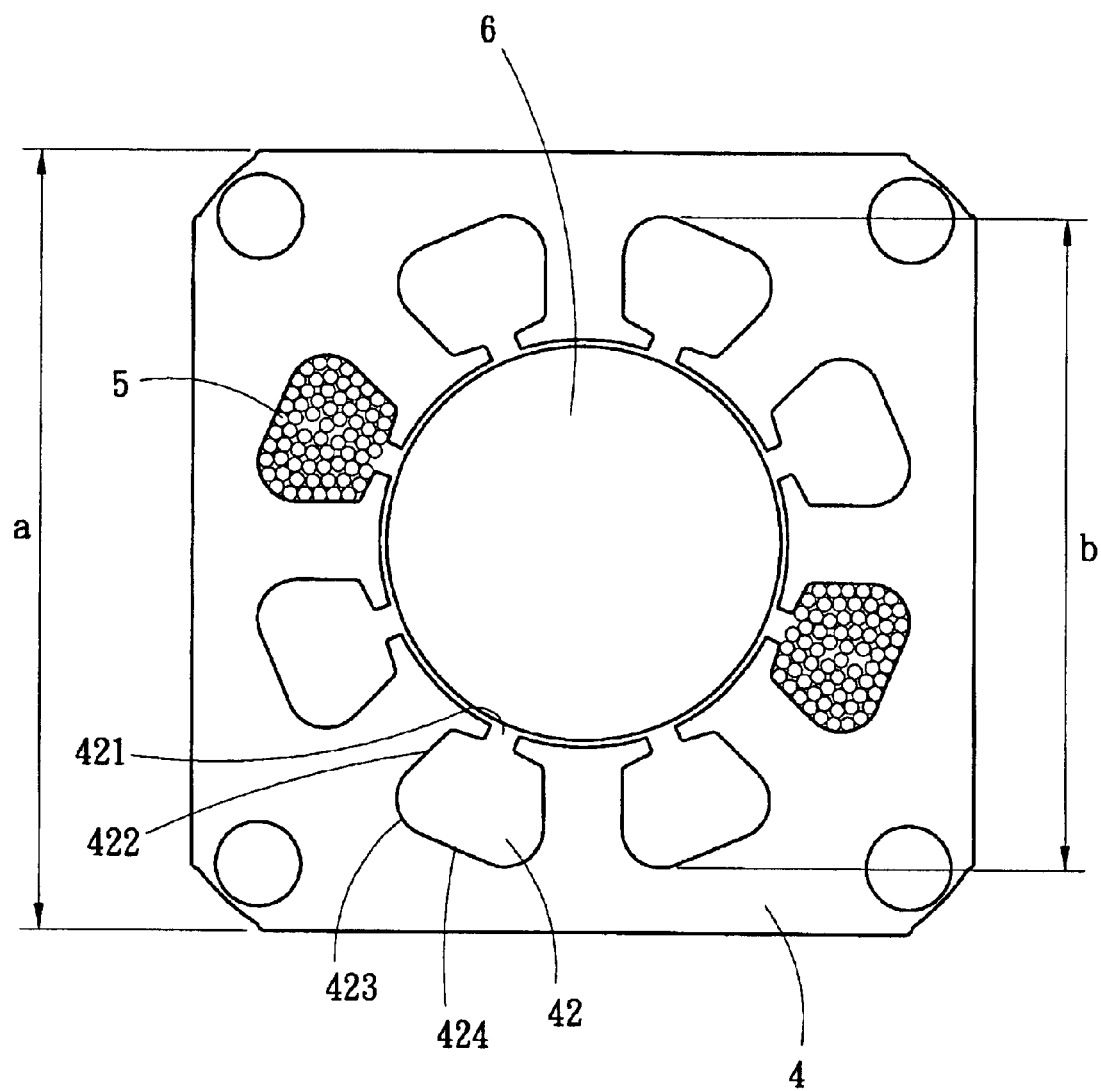
FIG. 2 is a plan view of the stator and the rotor of the conventional two-pole motor in assembled state.
Figure 3:
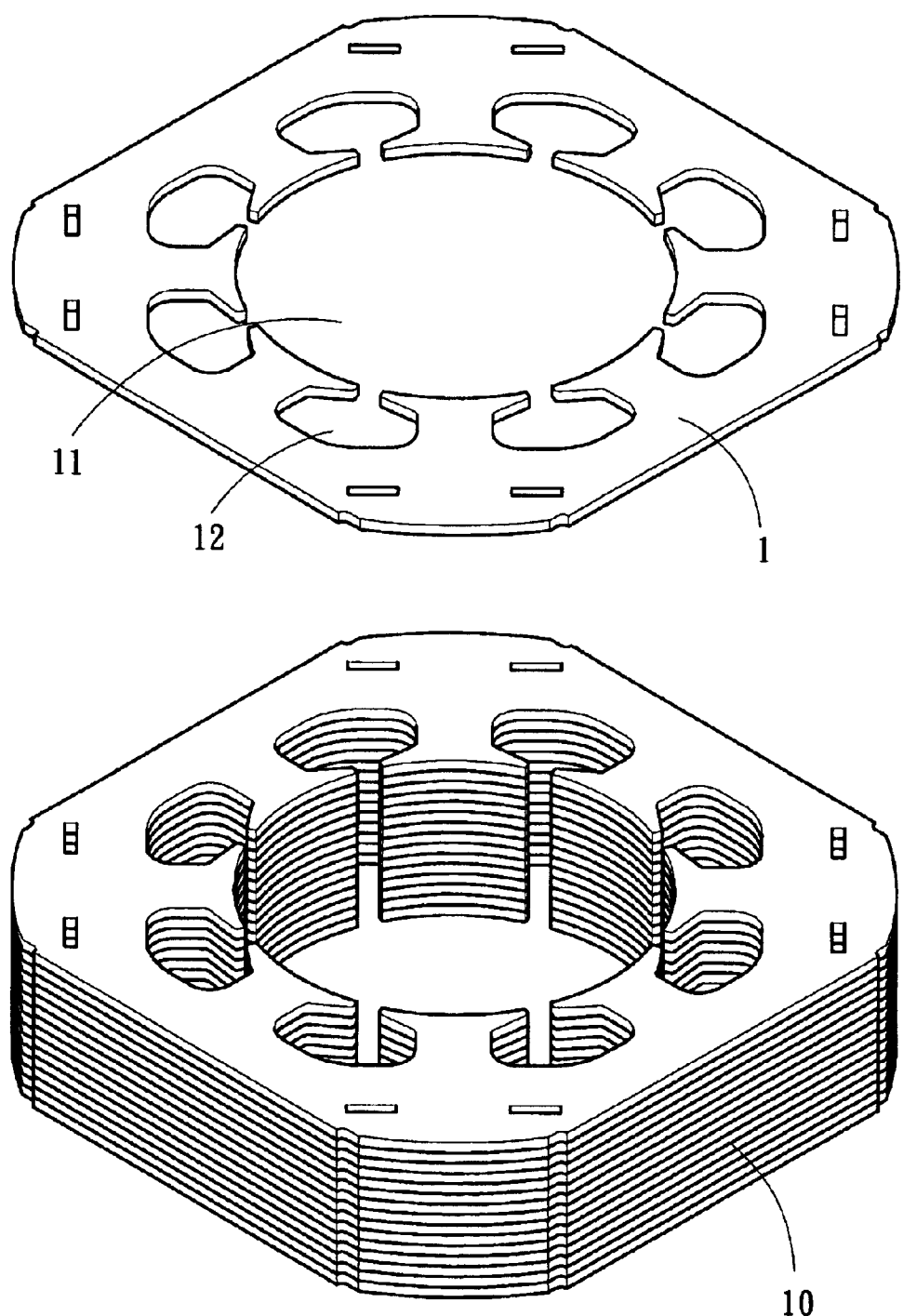
FIG. 3 is a perspective exploded view of the two-pole motor's stator in accordance with the invention.
Figure 4:
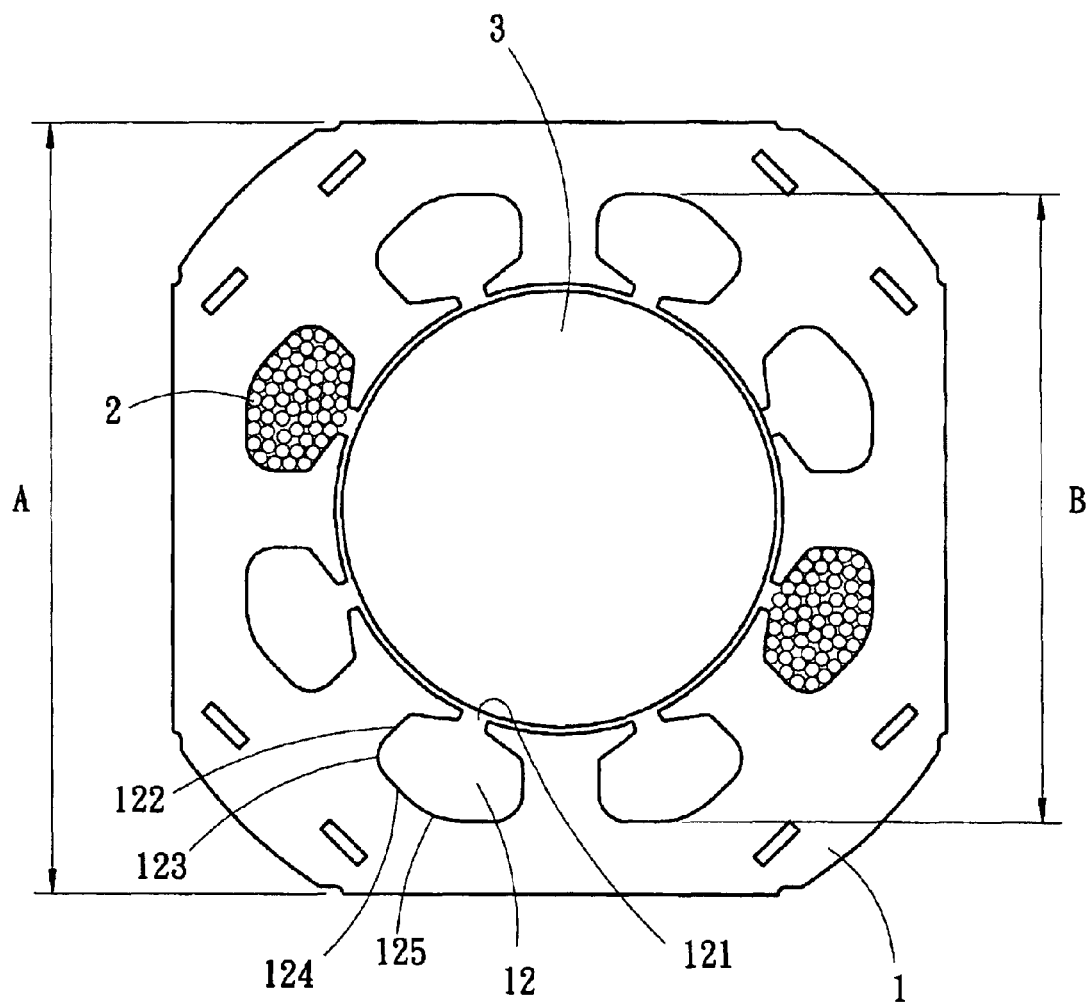
FIG. 4 is a plan view of the stator and the rotor of the two-pole motor in accordance with the invention in assembled state.

First of all, referring to FIGS. 3 and 4, the stator 10 in accordance with the invention is formed by stacking up a plurality of silicon steel sheets 1. The silicon steel sheets 1 each have a middle hole 11 and a plurality of slots 12 which are evenly distributed around the internal circumference of the middle hole 11 and serve to accommodate the silicon steel sheets 1.

Factors that are essential to the motor's design are as follows:
1. The output torque of motor is proportional to the square of the external diameter of a rotor (while this external diameter is slightly smaller than the middle hole 11 of the silicon steel sheets 1);
2. The height of stator's yoke (which means the range of effective diameter from the outermost point of each slot 12 to the rim of silicon steel sheets 1 of the stator 10) has effect on the stator's iron loss, the temperature rise and the rotation efficiency.
3. The area (slot-occupying ratio) and the form of the silicon steel sheets 1 of the motor's stator 10 have effect on the coil winding.

Accordingly, the design in accordance with the present invention is designed to increase the inner diameter of the middle hole 11 of the silicon steel sheets 1 for receiving a rotor 3 with larger outer diameter, thereby enhancing the output torsion. In enlarging the middle hole 11, the circumference is also increased so that the width of the slots 12 can be increased, too. Under the precondition without diminishing the area of slots 12, the depth of the slots 12 is reducible to prevent the height of the yoke of the silicon steel sheets 1 from being lowered.

The slots 12 in accordance with the invention are through corresponding slot necks 121 in connection with the middle hole 11, and two sides of the slot neck 121 are bent at an obtuse angle toward the outside and then in connection with two side rims extending radially outwardly from the middle hole 11. A rounded corner 123 is formed between each side rim 122 and a first end rim 124. An obtuse angle 125 is formed by the first end rim 124 and a second end rim, thereby forming a tapered end. Accordingly, the depth of the slots 12 is effectively reducible. Referring to FIG. 4, the effective outer diameter of the silicon steel sheets 1 is described as "A" while the effective outer diameter of the slots 12 is described as "B". Take an example that the effective outer diameter (A) of the silicon steel sheets 1 is 60 mm, the effective outer diameter (B) of the slots 12 is 48.8 mm and the diameter of the middle hole is about 35 mm. The diameter of the middle hole 11 and the effective outer diameter of the silicon steel sheets 1 are in a ratio of about 0.583:1. In comparison with the above-mentioned conventional stator's configuration, the stator is capable of accommodating a rotor 3 with greater outer diameter for enhancing its output torsion. Meanwhile, the yoke height is:

$(A-B)/2$

Substitute the known values $(60-48.8)/2$

And the yoke height is 5.6 mm. This is also larger than that (5 mm) of the conventional stator's configuration. Consequently, the yoke magnetic density is so minimized that it matches with tooth magnetic density of the stator. In addition, the stator's iron loss and the temperature rise are also reduced while the rotation efficiency is enhanced. Moreover, the whole area of the slots 12 with greater width and tapered end makes almost no difference from that of the conventional configuration despite enlargement of the middle hole 3. Besides, the slot-occupying ratio won't be increased. Furthermore, the wide and slim slots 12 even facilitate the assembly work of the coil 2.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A stator for a two-pole motor for a household fan comprising a plurality of stacked silicon steel sheets, each of the plurality of stacked silicon steel sheets having:

a) a middle hole for accommodating a rotor;

b) a plurality of slots evenly formed and distributed around an outer circumference of the middle hole; and c) a coil wound around the slots, wherein a diameter of the middle hole is between 34 mm and 36 mm and an effective outer diameter of each of the plurality of stacked silicon steel sheets is between 59 mm and 61 mm.

2. The stator according to claim 1, wherein each of the plurality of slots includes:

a) a slot neck communicating with the middle hole and having two sides extending at an obtuse angle;

b) two end rims connected at an obtuse angle;

c) two side rims, each located between one of the two sides of the slot neck and one of the two end rims; and d) two rounded corners, each rounded corner located between one of the two side rims and one of the two end rims.

\* \* \* \* \*